US009053296B2

(12) United States Patent
Mylroie et al.

(10) Patent No.: US 9,053,296 B2
(45) Date of Patent: Jun. 9, 2015

(54) DETECTING PLAGIARISM IN COMPUTER MARKUP LANGUAGE FILES

(75) Inventors: Steven Mylroie, Mountain View, CA (US); Robert Marc Zeidman, Cupertino, CA (US)

(73) Assignee: SOFTWARE ANALYSIS AND FORENSIC ENGINEERING CORPORATION, Cupertino, CA (US)

( * ) Notice: Subject to any disclaimer, the term of this patent is extended or adjusted under 35 U.S.C. 154(b) by 816 days.

(21) Appl. No.: 12/870,817

(22) Filed: Aug. 28, 2010

(65) Prior Publication Data

US 2012/0054595 A1    Mar. 1, 2012

(51) Int. Cl.
*G06F 17/00*    (2006.01)
*G06F 21/10*    (2013.01)
*G06F 17/22*    (2006.01)

(52) U.S. Cl.
CPC ............ *G06F 21/10* (2013.01); *G06F 17/2247* (2013.01)

(58) Field of Classification Search
CPC .................................................. G06F 17/2247
USPC ......................................................... 715/234
See application file for complete search history.

(56) References Cited

U.S. PATENT DOCUMENTS

| 6,282,698 | B1 | 8/2001 | Baker et al. | |
|---|---|---|---|---|
| 6,493,709 | B1 | 12/2002 | Aiken | |
| 6,976,170 | B1 | 12/2005 | Kelly | |
| 6,978,419 | B1 | 12/2005 | Kantrowitz | |
| 7,219,301 | B2 | 5/2007 | Barrie | |
| 7,356,188 | B2 * | 4/2008 | Venkatesan et al. | 382/229 |
| 7,493,596 | B2 | 2/2009 | Atkin et al. | |
| 7,503,035 | B2 | 3/2009 | Zeidman | |
| 7,568,109 | B2 | 7/2009 | Powell et al. | |
| 7,607,172 | B2 * | 10/2009 | Zurko et al. | 726/24 |
| 8,302,075 | B1 * | 10/2012 | Blas, Jr. | 717/113 |
| 2003/0217117 | A1 * | 11/2003 | Dan et al. | 709/218 |
| 2004/0230964 | A1 | 11/2004 | Waugh | |
| 2006/0004528 | A1 * | 1/2006 | Uehara et al. | 702/20 |
| 2008/0052662 | A1 | 2/2008 | Zeidman | |
| 2008/0270991 | A1 | 10/2008 | Zeidman | |
| 2009/0024936 | A1 * | 1/2009 | Ragan | 715/760 |
| 2009/0089754 | A1 | 4/2009 | Zeidman | |

OTHER PUBLICATIONS

Wagner, "Plagarism by Student Programmers" copyright 2000, p. 1-19.*
Mayrand, et al., "Experiment on the Automatic Detection of Function Clones in a Software System Using Metrics" copyright 1996, IEEE, p. 244-253.*
Prechelt, et al., "JPlag: Finding plagiarisms among a set of programs" Technical Report 2000-1, Mar. 28, 2000, p. 1-44.*
Kamiya, et al., "CCFinder: A Multilinguistic Token-Based Code Clone Detection System for Large Scale Source Code" IEEE Transactions of Software Engineering, vol. 28, No. 7, Jul. 2002, p. 654-670.*

(Continued)

*Primary Examiner* — Amelia Tapp
(74) *Attorney, Agent, or Firm* — Lowenstein Sandler LLP

(57) ABSTRACT

This invention converts markup language files such as HTML files into pseudocode that is structured like programming language source code in order to use source code copy detection tools to find pairs of markup language files that have been copied in full or in part.

27 Claims, 8 Drawing Sheets

(56) References Cited

OTHER PUBLICATIONS

Gormley, "HTML StripScripts 1.05", copyright 2007, CPAN, The Comprehensive PERL Archive Network, retrieved from http://search.cpan.org/~drtech/HTML-StripScripts-1.05/StripScripts.pm, p. 1-17.*
Signes, "App::Addex::Output::ToFile", copyright 2007, CPAN, The Comprehensive PERL Archive Network, retrieved from http://search.cpan.org/~rjbs/App-Addex-0.023/lib/App/Addex/Output/ToFile.pm, p. 1-2.*
Synytskyy, et al., "Resolution of Static Clones in Dynamic Web Pages", 5th International Workshop on Web Site Evaluation, Canada, Sep. 2003, p. 1-8.*
"CodeSuite User's Guide Version 4.7" retrieved from http://www.safe-corp.biz/downloads_articles.htm on Feb. 5, 2015, p. 1-134.*
"Copyscape" brochure, copyright Indigo Stream Technologies, Ltd. 2009, p. 1-6.*
Bailey, "The 20 Best Free Anti-Plagiarism Tools", Jun. 25, 2007, The Blog Herald, p. 1-6.*
Paul Heckel, "A Technique for Isolating Differences Between Files," Communications of the ACM 21(4), Apr. 1978, pp. 264-268., USA.
Michael J. Wise, "YAP3: Improved detection of similarities in computer program and other texts," SIGCSE '96, Philadelphia, PA, USA, Feb. 15-17, 1996, pp. 130-134.
Joy et al. "Plagiarism in Programming Assignments", IEEE Transactions on Education, vol. 42, No. 2, pp. 129-133,1999.
Marcus et al. "Identification of High-Level Concept Clones in Source Code," ase, pp. 107, 16th IEEE International Conference on Automated Software Engineering (ASE'01), 2001.
Aiken, A, Moss, "A System for Detecting Software Plagiarism" http://theory.stanford.edu/~aiken/moss/, retrieved Aug. 26, 2010 (2 pgs.).
Clough, Paul, "Plagiarism in Natural and Programming Languages", Department of Computer Science, University of Sheffield, UK, Jun. 2000, (31 pgs.).
"Plagiarism Detection—YAP", http://pam1.bcs.uwa.edu.au/~michaelw/YAP.html, accessed Aug. 26, 2010 (2 pgs.), Australia.
Zeidman, "Are There Copycats in Your Company?" Software Test & Performance, Oct. 2008, pp. 18-23, USA.
Baker, Brenda S., "On Finding Duplication and Near-Duplication in Large Software Systems," AT&T Bell Laboratories, 10 pages, 1995, Murray Hill, NJ.
Chilkat Software, "HtmlToXml ActiveX Reference," <http://www.chilkatsoft.com/refdoc/xHtmlToXmlRef.html>, 2 pages, retrieved Aug. 27, 2010.
Chilkat Software, "HTML-to-XML Component Features," <http://www.chilkatsoft.com/html-to-xml-features.asp>, 1 page, retrieved Aug. 27, 2010.
Coolutils.com, "Free Online HTML Converter," <www.coolutils.com/Online-HTML-Converter.php>, 2 pages, retrieved Jul. 8, 2010.
Codeplex.com, "Html Agility Pack," <http://htmlagilitypack.codeplex.com>, 338 pages, retrieved Aug. 26, 2010.
Sourceforge.net, "HTML Parser," <http://htmlparser.sourceforge.net>, 2 pages, retrieved Jul. 8, 2010.
Hunt et al., "An Algorithm for Differential File Comparison," Department of Electrical Engineering, Stanford University, Stanford, CA and Bell Laboratories, Murray Hill, NJ, 1976, 9 pages.
Hypernews.org, "Converters to and from HTML," <http://www.hypernews.org/HyperNews/get/www/html/converters.html>, retrieved Jul. 8, 2010, 5 pages.
Johnson, J Howard., "Substring Matching for Clone Detection and Change Tracking," Software Engineering Laboratory, National Research Council of Canada, 1994, 7 pages, Ottawa, Canada.
Lucca et al., "An Approach to Identify Duplicated Web Pages," IEEE Computer Society, 26 th Annual International Computer Software and Applications Conference, 2002, 6 pages.
Lutz et al., "Finding Plagiarisms among a Set of Programs with JPlag," Journal of Universal Computer Science, Nov. 28, 2002, vol. 8 No. 11, 23 pages.
Nirsoft.net, "HTMLAsText v1.11—HTML to text freeware converter," <http://www.nirsoft.net/utils/htmlastex.html> 2004-2009, 4 pages, retrieved Jul. 8, 2010.
W3C (World Wide Web Consortium), "Programming Language Filters," <http://www.w3.org/Tools/Prog_lang_filters.html>, 3 pages, retrieved Jul. 8, 2010.
Schleimer et al., "Winnowing: Local Algorithms for Document Fingerprinting," Jun. 9-12, 2003, 10 pages, Special Interest Group on Management of Data (SIGMOD), San Diego, CA.
Seabreezecomputers.com, "Cool HTML to BBCode Converter v. 1.25," <http://www.seabreezecomputers.com/html2bbcode>, 2006, 5 pages, retrieved Jul. 8, 2010.
Pike et al., "Sherlock: Plagiarism Detector," <http://www.cs.su.oz.au/~scilect/sherlock/>, 3 pages, retrieved May 17, 2010.
Hart et al., "Sherlock User Manual," <http://web.archive.org/web/20030510140152/http://www.dcs.warwick.ac.uk/boss/manuals/sherlock.html>, Nov. 2002, 3 pages, retrieved Aug. 27, 2010.
Website Databases, "HTML to PHP Converter :: Convert HTML to PHP or ASP," <http://www.websitedatabases.com/html-to-php.html>, 2003-2010, 3 pages, retrieved Jul. 8, 2010.
Whale, G., "Identification of Program Similarity in Large Populations," Department of Computer Science, University of New South Wales, Oct. 1988, 7 pages, The Computer Journal, vol. 33, No. 2, 1990, Kensington, Australia.
Wise, Michael J., "String Similarity via Greedy String Tiling and Running Karp—Rabin Matching," Dec. 1993, 17 pages, Department of Computer Science, University of Sydney, Australia.
Zeidman, Robert, "Multidimensional Correlation of Software Source Code," 7 pages, May 2008, Cupertino, CA, USA.
Zeidman, Robert, "Software Source Code Correlation," 2006, 10 pages, IEEE, Cupertino, CA, USA.

\* cited by examiner

```
<i>This text is in italics.</i>                              — 401

<script type="text/javascript" src="p7pxx/p7PM9scripts.js"></script>   — 402

<td height="25" colspan="2">                                 — 403
    <img src="graphics/gray-bar-product.gif" width="950"
height="25">
</td>                                                        — 404

<img src="graphics/gray-bar-product.gif" width="950" height="25">

<div id="p7PM9_1" class="p7PM9v08">                          — 405

<!-- This is a comment -->                                   — 406
```

Figure 4

DETECTING PLAGIARISM IN COMPUTER MARKUP LANGUAGE FILES

TECHNICAL FIELD

Embodiments of the present invention relate to detection of plagiarism, and more specifically to comparing markup language files to detect copying.

BACKGROUND

Tools and algorithms have been developed over the last several decades to assist researchers in detecting software plagiarism. Typically these tools and algorithms compare software source code to find signs of copying. A summary of available tools and algorithms is given by Paul Clough in his paper entitled *Plagiarism in Natural and Programming Languages: An Overview of Current Tools and Technologies*. Clough discusses tools and algorithms for finding plagiarism in generic text documents as well as in programming language source code files.

There are a number of source code copy detection programs currently available including the Plague program developed by Geoff Whale at the University of New South Wales, the YAP programs (YAP, YAP2, YAP3) developed by Michael Wise at the University of Sydney, Australia, the JPlag program, written by Lutz Prechelt and Guido Malpohl of the University Karlsruhe and Michael Philippsen of the University of Erlangen-Nuremberg, and the Measure of Software Similarity (MOSS) program developed at the University of California at Berkeley by Alex Aiken.

The most commercially successful program for source code copy detection is CodeMatch®, developed by Robert Zeidman, which is incorporated in the CodeSuite® program. The CodeSuite program further includes other tools for measuring and comparing software source code including Bit-Match®, CodeCLOC™, CodeCross®, CodeDiff®, and SourceDetective®.

Markup languages are forms of data description languages that are used for "marking up" text documents by providing additional information about the text. The Hypertext Markup Language ("HTML"), for example, uses tags within a text document to describe the layout of the text when displayed as web pages. Unlike programming languages, markup languages consist of tags that contain embedded layout information and other information. For example, tags can contain information about graphics, links, forms, form objects, comments, and scripting language statements. Because the tags contain many different types of information, it would be beneficial to have a tool that extracts the information from the markup language tags into files that can then be compared to find copying. It would also be beneficial to put the HTML code into a format that is usable by standard software source code copy detection tools to detect copying.

BRIEF DESCRIPTION OF THE DRAWINGS

The present invention is illustrated by way of example, and not by way of limitation, in the figures of the accompanying drawings and in which:

FIG. 4 illustrates examples of HTML tags.

DETAILED DESCRIPTION

Figure 1:
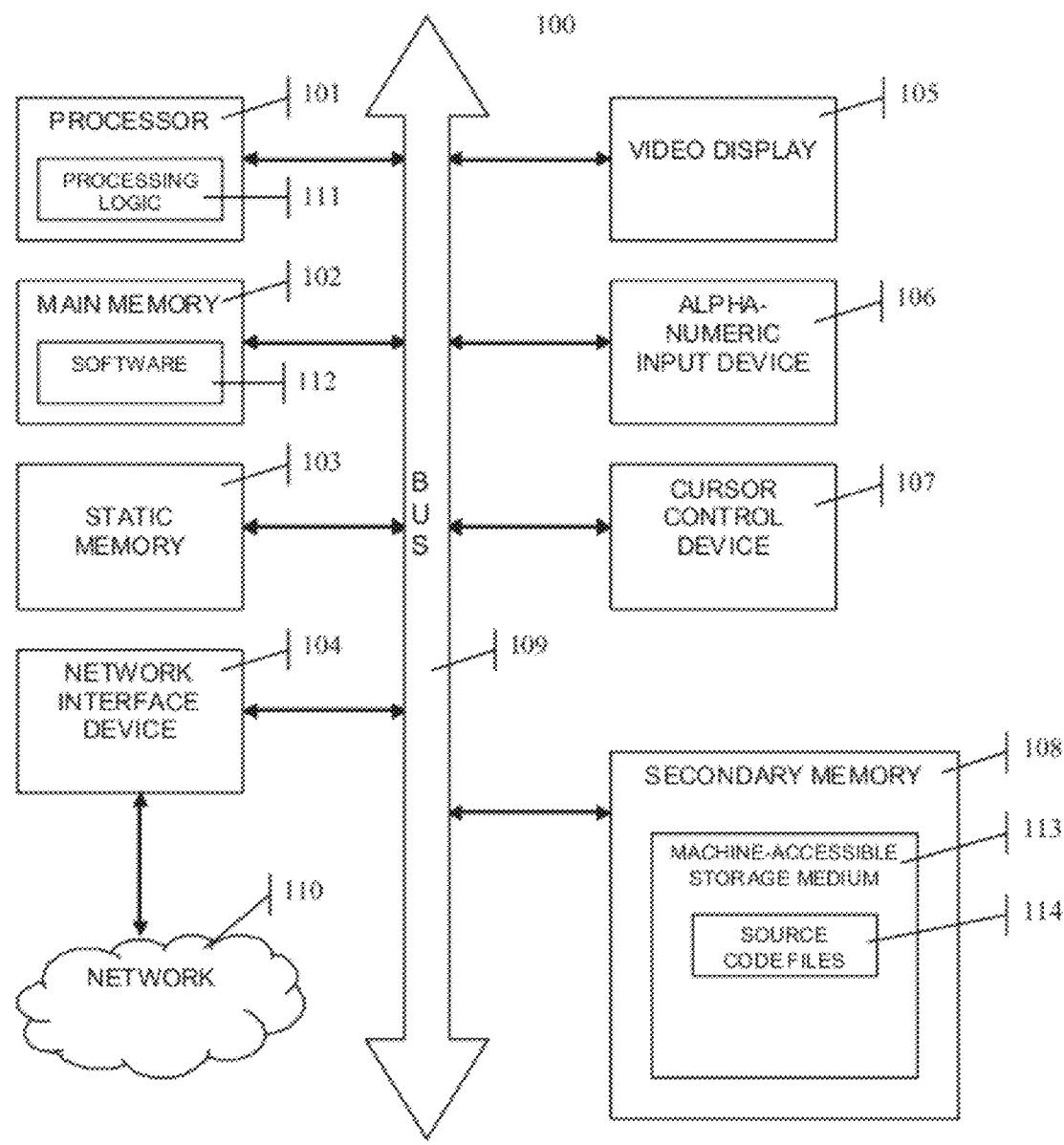
FIG. 1 illustrates an exemplary computer system, in accordance with embodiments of the present invention.

Embodiments of the invention are directed to a method and system for detecting copied markup language files. Signs of copying are detected by converting a markup language file into a pseudocode file where the pseudocode has a structure similar to programming language source code so that standard software copy detection tools can be used.

Embodiments of the invention make use of a basic knowledge of programming languages and program structures to create a pseudocode file from a markup language file.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "communicating," "executing," "passing," "determining," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

A machine-accessible storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

FIG. 1 illustrates a diagrammatic representation of a machine in the exemplary form of a computer system 100 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 100 includes a processing device (processor) 101, a main memory 102 (e.g., read-only memory (ROM), flash memory, dynamic random access memory (DRAM) such as synchronous DRAM (SDRAM) or Rambus DRAM (RDRAM), etc.), a static memory 103 (e.g., flash memory, static random access memory (SRAM), etc.), and a secondary memory 108 (e.g., a data storage device), which communicate with each other via a bus 109.

The processor 101 represents one or more general-purpose processing devices such as a microprocessor, central processing unit, or the like. More particularly, the processor 101 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 101 may also be one or more special-purpose processing devices such as an application specific integrated circuit (ASIC), a field programmable gate array (FPGA), a digital signal processor (DSP), network processor, or the like. The processor 101 is configured to execute the instructions 111 for performing the operations and steps discussed herein.

The computer system 100 may further include a network interface device 104. The computer system 100 also may include a video display unit 105 (e.g., a liquid crystal display (LCD) or a cathode ray tube (CRT)), an alphanumeric input device 106 (e.g., a keyboard), and a cursor control device 107 (e.g., a mouse).

The secondary memory 108 may include a machine-accessible storage medium 113 on which is stored one or more sets of instructions 112 (e.g., software) embodying any one or more of the methodologies or functions described herein. The instructions 112 may reside, completely or at least partially, within the main memory 102 and/or within the processor 101 during execution thereof by the computer system 100, the main memory 102 and the processor 101 also constituting machine-accessible storage media. The instructions 112 may further be transmitted or received over a network 110 via the network interface device 104.

The machine-accessible storage medium 113 may also be used to store source code files 114. Source code files 114 may also be stored in other sections of computer system 100, such as static memory 103.

While the machine-accessible storage medium 113 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing or encoding a set of instructions for execution by the machine and that cause the machine to perform any one or more of the methodologies of the present invention. The term "machine-accessible storage medium" shall accordingly be taken to include, but not be limited to, solid-state memories, and optical and magnetic media.

Figure 2:
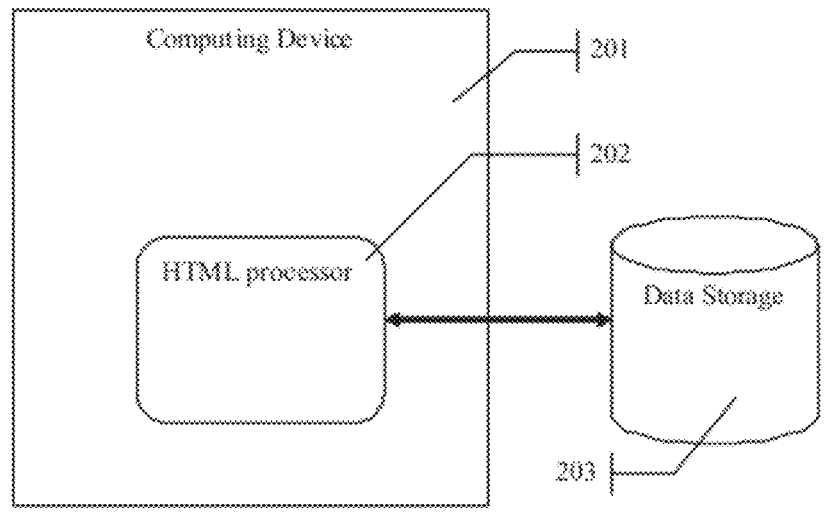
FIG. 2 is a block diagram of a system for the present invention in accordance with one embodiment of the invention.

FIG. 2 illustrates an exemplary system 200 for converting markup language files to pseudocode files in accordance with one embodiment of the present invention. The system includes a computing device 201 and a data storage device 203. The data storage device 203 may be a mass storage device, such as a magnetic or optical storage based disk or tape, and may be part of the computing device 201, or be coupled with the computing device 201 directly or via a network (e.g., a wide area network (WAN), such as the Internet, a private network such as a local area network (LAN), a wireless network, a mobile communication network, or similar communication system). The computing device 201 may be a personal computer (PC), palm-sized computing device, personal digital assistant (PDA), server, or other computing device.

The computing device 201 hosts an HTML processor 202 that can convert markup language code files to pseudocode files, embodiments of which are described later. The markup language files being converted and the generated pseudocode files may be stored in the data storage device 203.

In one embodiment, the HTML processor 202 pre-processes the files being compared prior to performing the comparison. As will be discussed in more detail below, the HTML processor 202 may create data structures and temporary files for the markup language files being converted, and may store the data structures and temporary files in the data storage 203. The HTML processor 202 may then use the data structures and temporary files to generate the pseudocode files that may in turn be stored in the data storage 203. In one embodiment, the pseudocode files may also be displayed to a user of the computing device 201 or another computing device coupled to the computing device 201 (e.g., directly or via a network).

Figure 3:
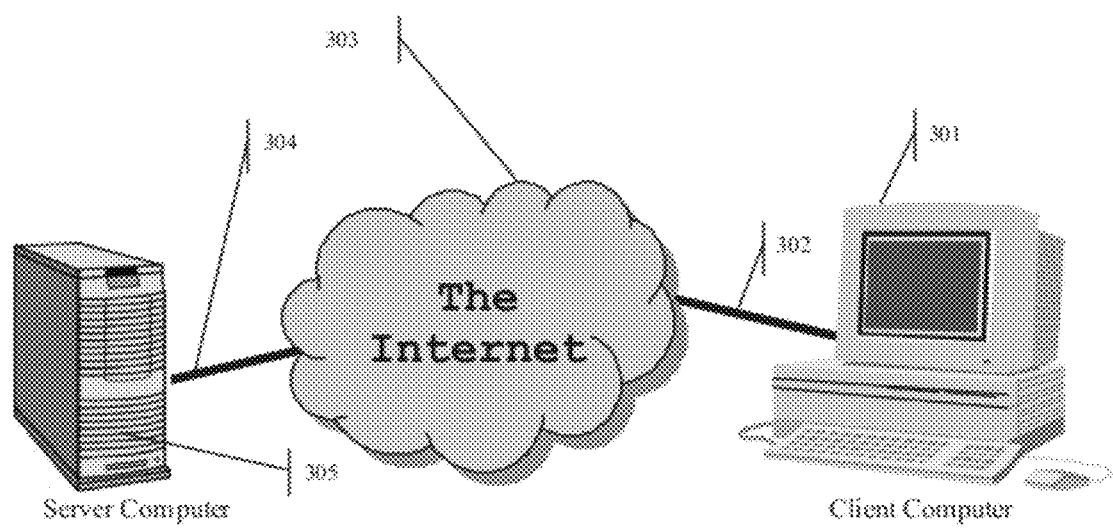
FIG. 3 is a block diagram of a typical client-server system architecture for transmitting HTML pages over the Internet.

FIG. 3 illustrates a client-server system 300 used to transmit HTML files over the Internet. A client computer 301 is connected to the Internet 303 via an Internet connection 302. The Internet connection 302 can include any mechanism for communication, including, but not limited to a phone line, DSL line, cable service, or satellite service. A server computer 305 is also connected to the Internet 303 via an Internet connection 304. The Internet connection 304 can include any mechanism for communication including, but not limited to a phone line, DSL line, cable service, or satellite service.

The server computer 305 receives requests for one or more web pages from the client computer 301 via the Internet 303. The server computer 305 stores web pages and computer code for generating web pages in long-term storage. The long-term storage can include, but is not limited to an internal hard drive, an external hard drive, or network-connected storage. Static web pages can be served to the client computer 301 from the server computer 305. For example, a company home page can be a static web page that is the same for each user that visits the website. Dynamic web pages can be served to the client computer 301 from the server computer 305. For example, after a user at the client computer 301 logs into a website, that user will see a page that has information unique to the user, such as the user's name, contact information, and previous transactions for goods from the website. Dynamic web page can be created by program code executed by the server computer 305, the execution of the program code generating an HTML page. Dynamic web page can be created by an HTML pages that include program code integrated in the HTML code for the HTML page. In this case, the server computer 305 will execute the program code while extracting it from the HTML code such that the client computer 301 receives only the HTML code plus any changes caused by the execution of the program code.

In one embodiment, the server computer 305 examines each line of an HTML file to detect copying prior to serving the HTML file to the client computer 301. In order to detect copying, the server computer 305 examines each line of the HTML file for one or more HTML tags. The HTML tags can be one of two types: paired tags or unpaired tags. Paired tags contain text between a tag and its companion tag. The first tag is referred to as the "opening tag" and the second tag is referred to as the "closing tag." Opening and closing tags may appear on the same line or may appear on different lines. FIG. 4 shows examples of paired tags <i> and </i> 401, <script> and </script> 402, and </td> and </td> 403. Unpaired tags do not have a companion tag. Unpaired tags are also known as "singular tags" or "stand-alone tags." FIG. 4 shows examples of unpaired tags <img> 404, <div> 405, and <!-- 406.

Figure 5:
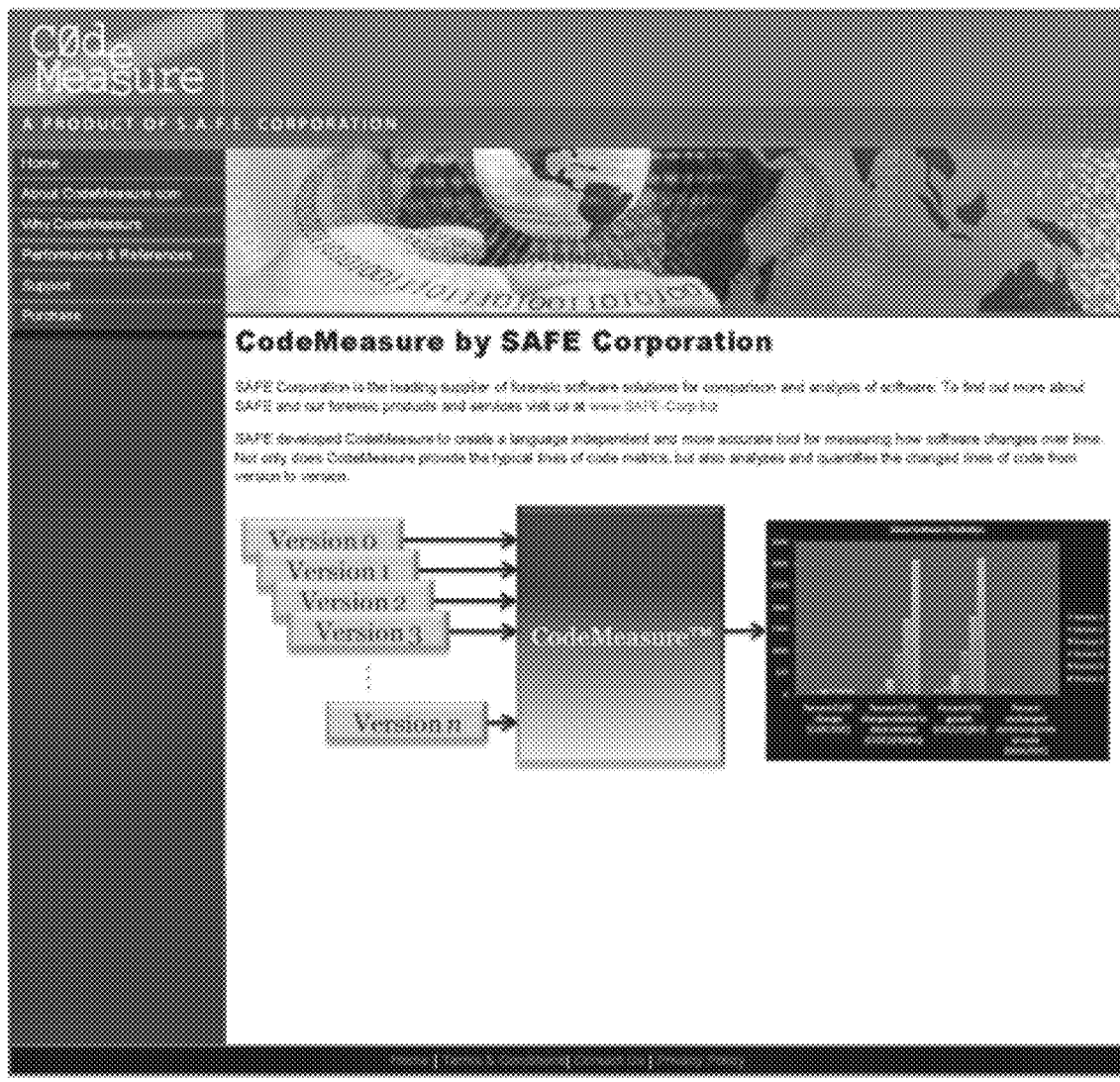
FIG. 5 is an example web page created from HTML, JavaScript, CSS, and content text.

FIG. 5 illustrates a sample web page created from HTML that incorporates JavaScript, Cascading Style Sheet (CSS) code, and content text. "Content text" refers to the text that is displayed on the web page. For convenience, let us refer to scripts in any scripting language, CSS, and content text as "embedded objects." HTML pages may include none, one, or many types of embedded objects. The HTML for this sample web page that includes the JavaScript, CSS, and content text is given below.

```
<!DOCTYPE HTML PUBLIC "-//W3C//DTD HTML 4.01 Transitional//EN">
<html>
<!-- InstanceBegin template="/Templates/back_page.dwt" codeOutsideHTMLIsLocked="false" -->
<head>
<meta http-equiv="X-UA-Compatible" content="IE=EmulateIE7"/>
<title>About CodeMeasure.com, CodeMeasure, and SAFE Corporation</title>
<meta name="keywords" content="measure lines of code, changed lines of code, CLOC">
<meta http-equiv="Content-Type" content="text/html; charset=iso-8859-1">
<script language="JavaScript" type="text/JavaScript">
function MM_preloadImages( ) { //v3.0
  var d=document; if(d.images){ if(!d.MM_p) d.MM_p=new Array( );
    var imp=d.MM_p.length,a=MM_preloadImages.arguments;
      for(i=0; i<a.length; i++)
    if (a[i].indexOf("#")!=0){ d.MM_p[j]=new Image; d.MM_p[j++].src=a[i];}}
}
</script>
<script language="JavaScript" src="scripts/safe_utilities.js"></script>
<style type="text/css" media="screen">
a:link {
        color: 993333;
        text-decoration: none;
}
a:visited {
        color: #996633;
        text-decoration: none;
}
body, td, th {
        font-family: Arial;
        font-size: 12px;
        color: #000000;
}
h1 {
        font-size: 24px;
        color: #000000;
        font-weight: bold;
}
h2 {
        font-size: 18px;
        color: #000000;
        font-weight: bold;
}
```

-continued

```
h3 {
        font-size: 16px;
        color: #000000;
        font-weight: bold;
}
a:hover {
        text-decoration: underline;
}
a:active {
        text-decoration: none;
}
</style>
<!-- InstanceBeginEditable name="head" -->
<!-- InstanceEndEditable -->
<link href="p7pmm/p7PMMv08.css" rel="stylesheet" type="text/css" media="all">
<link rel="SHORTCUT ICON" href="favicon.ico"/>
<script type="text/javascript" src="p7pmm/p7PMMscripts.js"></script>
</head>
<body bgcolor="E8EBEF" alink="#FF3300" leftmargin="0" topmargin="0">
<table width="950" height="909" border="1" align="center" cellpadding="0" cellspacing="0">
 <tr>
  <td height="75" colspan="2" bgcolor="#0a73bb">
        <a href="index.htm"><img src="graphics/codemeasure-logo-web.gif"
                alt="CodeMeasure Logo" width="181" height="80" border="0"></a>
  </td>
 </tr>
 <tr>
  <td height="25" colspan="2">
        <img src="graphics/gray-bar-product.gif" alt="Software Analysis and
                Forensic Engineering" width="950" height="25">
  </td>
 </tr>
 <tr>
  <td height="5" colspan="2"><img src="graphics/blue_sq.gif" width="950"
        height="5"></td>
 </tr>
 <tr>
  <td width="181" align="left" valign="top" bgcolor="#6e0701">
    <table width="181" border="0" cellpadding="0" cellspacing="0">
      <tr>
       <td width="218" align="left" valign="top">
        <div id="p7PMM_1" class="p7PMMv08">
          <ul class="p7PMM">
            <li><a href="index.htm" class="p7PMMv08">Home</a></li>
            <li><a href="about.htm">About
              CodeMeasure.com</a></li>
            <li><a href="why_codemeasure.htm">Why
                        CodeMeasure</a></li>
            <li><a href="performance.htm">Performance
                        & References</a></li>
            <!--<li><a href="partners.htm">Partners</a>
                        <div>
             <ul>
              <li><a href="partners/becoming.htm">Become a
                                partner</a></li>
              <li><a href="partners/register.htm">Partner
                                        register/login</a></li>
             </ul>
            </div>
                        </li>-->
            <li><a href="support.htm">Support</a></li>
            <li><a href="purchase.htm">Purchase</a></li>
          </ul>
        <!--[if lte IE 7]>
<style>.p7PMMv08, .p7PMMv08 a, .p7PMMv08 ul
{height:1%;}.p7PMMv08 li{float:left;clear:both;width:100%;}</style>
<![endif]-->
         <!--[if IE 5.500]>
<style>.p7PMMv08 {position: relative; z-index: 9999999;}</style>
<![endif]-->
         <!--[if IE 5]>
<style>.p7PMMv08 a, .p7PMMv08 ul
{height: 1%; overflow: visible !important;}</style>
<![endif]-->
<script type="text/javascript">
P7_PMMop('p7PMM_1',0,4,-5,-5,0,0,0,1,0,3,1,1,0,0);
</script>
        </div>
       </td>
```

```
      </tr>
    </table>
    <p><br>
    </p>
<td width="619" align="left" valign="top" bgcolor="#FFFFFF">
  <table width="540" border="0" cellpadding="0" cellspacing="0">
    <tr>
      <td height="145" align="left" valign="top" bgcolor="0673bb">
        <img src="graphics/codemeasure_head_graphic.jpg"
            alt="CodeMeasure Banner" width="767" height="140">
      </td>
    </tr>
    <tr>
      <td height="478" align="center" valign="top" bgcolor="#FFFFFF">
        <table width="750" border="0" align="center" cellpadding="5">
          <tr>
            <td>
              <h1 align="left"><font face="Arial">
                CodeMeasure by SAFE Corporation</font></h1>
              <p>SAFE Corporation is the leading supplier of forensic
                        software solutions for comparison and analysis of
                        software. To find out more about SAFE and our forensic
                        products and services visit us at
                        <a href=http://www.SAFE-corp.biz/
                           target="_blank">www.SAFE-Corp.biz</a></p>
              <p>SAFE developed CodeMeasure to create a language
                        independent and more accurate tool for measuring how
                        software changes over time. Not only does CodeMeasure
                provide the typical lines of code metrics, but also
                        analyzes and quantifies the changed lines of code from
                        version to version. </p>
              <h2><font face="Arial"> </font>
                  <img src="graphics/MeasureCode.jpg" alt="CodeMeasure
                            Operation Diagram" width="750" align="middle"/>
              </h2>
            </td>
          </tr>
        </table>
      </tr>
    </table>
  </td>
</tr>
<tr bgcolor="464646">
  <td height="25" colspan="2" bgcolor="#000000">
    <div align="center"><font color="#FFFFFF" face="Arial">
      <span class="style1"><a href="index.htm" rel="nofollow">Home
    </a> | <a href="terms.htm" rel="nofollow">Terms
    & Conditions</a>| <a href="contact.htm">Contact
    Us</a> | <a href="privacy.htm" rel="nofollow">Privacy
    Policy</a> </span></font></div>
  </td>
</tr>
</table>
</body>
<!-- InstanceEnd -->
</html>
```

This example of HTML code includes JavaScript embedded in the HTML code but could include any one of several scripting languages that can be embedded in HTML code. This HTML code also includes a link to a GIF format graphics file and links to other HTML pages. Links may point to other graphics format files including, but not limited to, JPEG and PNG. Links may also point to other embedded objects including but not limited to Adobe® Flash® files, Adobe® PDF files, Apple QuickTime® files, and standard media files such as MPEG or WAV files.

In one embodiment, links to other markup language files can be traversed manually or automatically to find other markup language files that can be converted to pseudocode files and compared to detect copying. In one embodiment, the pseudocode files are compared using standard source code copy detection tools, such as CodeMatch. Links to other embedded object files including graphics files and multimedia files can be used to obtain the embedded object files from different web pages to find signs of copying. In one embodiment, copying is detected if the compared embedded object files have an exact match. In an alternate embodiment, copying is detected if the embedded object files have a near exact match, such as above a predetermined threshold (e.g., 95% match). In one embodiment, the comparison of embedded object files is performed using simple bit comparison tools, such as the UNIX diff command or the Windows FC command. In alternate embodiments, more sophisticated tools are used to detect copying of embedded object files. In one embodiment, Flash decompilers are used to decompile the Adobe Flash files into ActionScript source code files; the ActionScript source code files are then compared using standard source code copy detection tools, such as CodeMatch.

In one embodiment, the script code, for example JavaScript code, that is embedded in the markup language code is extracted from the markup language file and saved in a separate file. The script code can be removed from the markup language file and copied to another file, as described below in conjunction with FIG. 7 and FIG. 8. The script code can also remain in the markup language file and copied to another file as described below in conjunction with FIG. 7 and FIG. 8. The extraction allows the programming language script code that has been extracted from one markup language file to be compared to programming language script code that has been extracted from another markup language file to detect copying. In one embodiment, comparison of extracted script code is performed using a standard source code copy detection tool such as CodeMatch.

The JavaScript extracted from the sample web page HTML of FIG. 5 is shown below:

```
function MM_preloadImages( ) {
    //v3.0
    var d=document;
    if(d.images){
        if(!d.MM_p) d.MM_p=new Array( );
        var i,j=d.MM_p.length,a=MM_preloadImages.arguments;
        for(i=0; i<a.length; i++)
        if (a[i].indexOf("#")!=0){
            d.MM_p[j]=new Image;
            d.MM_p[j++].src=a[i];
        }
    }
}
P7_PMMop('p7PMM_1',0,4,-5,-5,0,0,0,1,0,3,1,1,0,0);
```

Note that this extracted JavaScript code is a straightforward copy of chunks of text within the HTML page. The CSS code is extracted from the HTML file and saved in a separate file. The CSS extracted from the sample web page HTML given above is shown below.

```
a:link {
    color: 993333;
    text-decoration: none;
}
a:visited {
    color: #996633;
    text-decoration: none;
}
body, td, th {
    font-family: Arial;
    font-size: 12px;
    color: #000000;
}
h1 {
    font-size: 24px;
    color: #000000;
    font-weight: bold;
}
h2 {
    font-size: 18px;
    color: #000000;
    font-weight: bold;
}
h3 {
    font-size: 16px;
    color: #000000;
    font-weight: bold;
}
a:hover {
    text-decoration: underline;
}
a:active {
    text-decoration: none;
}
```

Note that this extracted CSS code is also a straightforward copy of chunks of text within the HTML page. The content text is extracted from the HTML file and saved in a separate file. The content text extracted from the sample web page HTML in FIG. 5 is shown below.

```
About CodeMeasure.com, CodeMeasure, and SAFE Corporation
Home
About CodeMeasure.com
Why CodeMeasure
Performance & References
Support
Purchase
CodeMeasure by SAFE Corporation
SAFE Corporation is the leading supplier of forensic software solutions for
comparison and analysis of software. To find out more about SAFE and
our forensic products and services visit us at www.SAFE-Corp.biz
SAFE developed CodeMeasure to create a language independent and
more accurate tool for measuring how software changes over time. Not
only does CodeMeasure provide the typical lines of code metrics, but
also analyzes and quantifies the changed lines of code from version to
version.
Home
|
Terms & Conditions
|
Contact Us
|
Privacy Policy
```

Note that this extracted content text is also a straightforward copy of chunks of text within the HTML page. The HTML that remains after the embedded objects have been extracted is then converted by this embodiment of the invention into the pseudocode below.

```
void meta( )
{
    char* http-equiv = "X-UA-Compatible";
    char* content = "IE=EmulateIE7";
}
void title( )
{
    char* value = "About CodeMeasure.com, CodeMeasure, and SAFE
    Corporation";
}
void meta_1( )
{
    char* name = "keywords";
    char* content = "measure lines of code, changed lines of code, CLOC";
}
void meta_2( )
{
    char* http-equiv = "Content-Type";
    char* content = "text/html; charset=iso-8859-1";
}
void script( )
{
    char* language = "JavaScript";
    char* type = "text/JavaScript";
    char* src = "file://~/sample_internal_A.js";
}
void script_1( )
{
    char* language = "JavaScript";
    char* src = "scripts/safe_utilities.js";
}
void link( )
{
    char* type = "text/css";
    char* media = "screen";
    char* rel = "stylesheet";
    char* href = "file://~/sample_internal_A.css";
}
void link_1( )
{
    char* href = "p7pmm/p7PMMv08.css";
    char* rel = "stylesheet";
    char* type = "text/css";
    char* media = "all";
```

-continued

```
}
void link_2( )
{
    char* rel = "SHORTCUT ICON";
    char* href = "favicon.ico";
}
void script_2( )
{
    char* type = "text/javascript";
    char* src = "p7pmm/p7PMMscripts.js";
}
void head( )
{
    meta( );
    title( );
    meta_1( );
    meta_2( );
    script( );
    script_1( );
    link( );
    /* <!-- InstanceBeginEditable name="head" --> */
    /* <!-- InstanceEndEditable --> */
    link_1( );
    link_2( );
    script_2( );
}
void img( )
{
    char* src = "graphics/codemeasure-logo-web.gif";
    char* alt = "CodeMeasure Logo";
    char* width = "181";
    char* height = "80";
    char* border = "0";
}
void a( )
{
    char* href = "index.htm";
    img( );
}
void td( )
{
    char* height = "75";
    char* colspan = "2";
    char* bgcolor = "#0a73bb";
    a( );
}
void tr( )
{
    td( );
}
void img_1( )
{
    char* src = "graphics/gray-bar-product.gif";
    char* alt = "Software Analysis and Forensic Engineering";
    char* width = "950";
    char* height = "25";
}
void td_1( )
{
    char* height = "25";
    char* colspan = "2";
    img_1( );
}
void tr_1( )
{
    td_1( );
}
void img_2( )
{
    char* src = "graphics/blue_sq.gif";
    char* width = "950";
    char* height = "5";
}
void td_2( )
{
    char* height = "5";
    char* colspan = "2";
    img_2( );
}
```

-continued

```
void tr_2( )
{
    td_2( );
}
void a_1( )
{
    char* href = "index.htm";
    char* class = "p7PMMv08";
    char* value = "Home";
}
void li( )
{
    a_1( );
}
void a_2( )
{
    char* href = "about.htm";
    char* value = "About CodeMeasure.com";
}
void li_1( )
{
    a_2( );
}
void a_3( )
{
    char* href = "why_codemeasure.htm";
    char* value = "Why CodeMeasure";
}
void li_2( )
{
    a_3( );
}
void a_4( )
{
    char* href = "performance.htm";
    char* value = "Performance & References";
}
void li_3( )
{
    a_4( );
}
void a_5( )
{
    char* href = "support.htm";
    char* value = "Support";
}
void li_4( )
{
    a_5( );
}
void a_6( )
{
    char* href = "purchase.htm";
    char* value = "Purchase";
}
void li_5( )
{
    a_6( );
}
void ul( )
{
    char* class = "p7PMM";
    li( );
    li_1( );
    li_2( );
    li_3( );
    /* <!--<li><a href="partners.htm">Partners</a>
        <div>
        <ul>
        <li><a href="partners/becoming.htm">Become a partner</a></li>
        <li><a href="partners/register.htm">Partner register/login</a></li>
        </ul>
        </div>
        </li>--> */
    li_4( );
    li_5( );
}
void script_3( )
{
```

```
        char* type = "text/javascript";
        char* src = "file://~/sample_internal_B.js";
}
void div( )
{
        char* id = "p7PMM_1";
        char* class = "p7PMMv08";
        ul( );
        /* <!--[if lte IE 7]>
        <style>.p7PMMv08, .p7PMMv08 a, .p7PMMv08 ul
        {height:1%;}.p7PMMv08
        li{float:left;clear:both;width:100%;}</style>
        <![endif]--> */
        /* <!--[if IE 5.500]>
        <style>.p7PMMv08 {position: relative; z-index: 9999999;}</style>
        <![endif]--> */
        /* <!--[if IE 5]>
        <style>.p7PMMv08 a, .p7PMMv08 ul {height: 1%; overflow: visible
        !important;}</style>
        <![endif]--> */
        script_3( );
}
void td_3( )
{
        char* width = "218";
        char* align = "left";
        char* valign = "top";
        div( );
}
void tr_3( )
{
        td_3( );
}
void table( )
{
        char* width = "181";
        char* border = "0";
        char* cellpadding = "0";
        char* cellspacing = "0";
        tr_3( );
}
void br( )
{
}
void p( )
{
        br( );
}
void img_3( )
{
        char* src = "graphics/codemeasure_head_graphic.jpg";
        char* alt = "CodeMeasure Banner";
        char* width = "767";
        char* height = "140";
}
void td_4( )
{
        char* height = "145";
        char* align = "left";
        char* valign = "top";
        char* bgcolor = "0673bb";
        img_3( );
}
void tr_4( )
{
        td_4( );
}
void font( )
{
        char* face = "Arial";
        char* value = "CodeMeasure by SAFE Corporation";
}
void h1( )
{
        char* align = "left";
        font( );
}
void a_7( )
{
        char* href = "http://www.SAFE-corp.biz/";
        char* target = "_blank";
        char* value = "www.SAFE-Corp.biz";
}
void p_1( )
{
        char* value = "SAFE Corporation is the leading supplier of forensic
                software solutions for comparison and analysis of software. To
                find out more about SAFE and our forensic products and services
                visit us at ";
        a_7( );
}
void p_2( )
{
        char* value = "SAFE developed CodeMeasure to create a language
                independent and more accurate tool for measuring how software
                changes over time. Not only does CodeMeasure provide the typi-
cal
                lines of code metrics, but also analyzes and quantifies the changed
                lines of code from version to version. ";
}
void font_1( )
{
        char* face = "Arial";
}
void img_4( )
{
        char* src = "graphics/MeasureCode.jpg";
        char* alt = "CodeMeasure Operation Diagram";
        char* width = "750";
        char* align = "middle";
}
void h2( )
{
        font_1( );
        img_4( );
}
void td_5( )
{
        h1( );
        p_1( );
        p_2( );
        h2( );
}
void tr_5( )
{
        td_5( );
}
void table_1( )
{
        char* width = "750";
        char* border = "0";
        char* align = "center";
        char* cellpadding = "5";
        tr_5( );
}
void td_6( )
{
        char* height = "478";
        char* align = "center";
        char* valign = "top";
        char* bgcolor = "#FFFFFF";
        table_1( );
}
void tr_6( )
{
        td_6( );
}
void table_2( )
{
        char* width = "540";
        char* border = "0";
        char* cellpadding = "0";
        char* cellspacing = "0";
        tr_4( );
        tr_6( );
}
void td_7( )
{
        char* width = "619";
```

```
        char* align = "left";
        char* valign = "top";
        char* bgcolor = "#FFFFFF";
        table_2( );
}
void td_8( )
{
        char* width = "181";
        char* align = "left";
        char* valign = "top";
        char* bgcolor = "#6e0701";
        table( );
        p( );
        td_7( );
}
void tr_7( )
{
        td_8( );
}
void a_8( )
{
        char* href = "index.htm";
        char* rel = "nofollow";
        char* value = "Home";
}
void a_9( )
{
        char* href = "terms.htm";
        char* rel = "nofollow";
        char* value = "Terms & Conditions";
}
void a_10( )
{
        char* href = "contact.htm";
        char* value = "Contact Us";
}
void a_11( )
{
        char* href = "privacy.htm";
        char* rel = "nofollow";
        char* value = "Privacy Policy";
}
void span( )
{
        char* class = "style1";
        a_8( );
        char* value = " | ";
        a_9( );
            value = "| ";
        a_10( );
            value = " | ";
        a_11( );
}
void font_2( )
{
        char* color = "#FFFFFF";
        char* face = "Arial";
        span( );
}
void div_1( )
{
        char* align = "center";
        font_2( );
}
void td_9( )
{
        char* height = "25";
        char* colspan = "2";
        char* bgcolor = "#000000";
        div_1( );
}
void tr_8( )
{
        char* bgcolor = "464646";
        td_9( );
}
void table_3( )
{
        char* width = "950";
```

```
        char* height = "909";
        char* border = "1";
        char* align = "center";
        char* cellpadding = "0";
        char* cellspacing = "0";
        tr( );
        tr_1( );
        tr_2( );
        tr_7( );
        tr_8( );
}
void body( )
{
        char* bgcolor = "E8EBEF";
        char* alink = "#FF3300";
        char* leftmargin = "0";
        char* topmargin = "0";
        table_3( );
}
void html( )
{
        /* <!-- InstanceBegin template="/Templates/back_page.dwt"
        codeOutsideHTMLIsLocked="false" --> */
        head( );
        body( );
        /* <!-- InstanceEnd --> */
}
int main(int argc, char* argv[ ])
{
        /* <!DOCTYPE HTML PUBLIC "-//W3C//DTD HTML 4.01
        Transitional//EN"> */
        html( );
}
```

Figure 6:
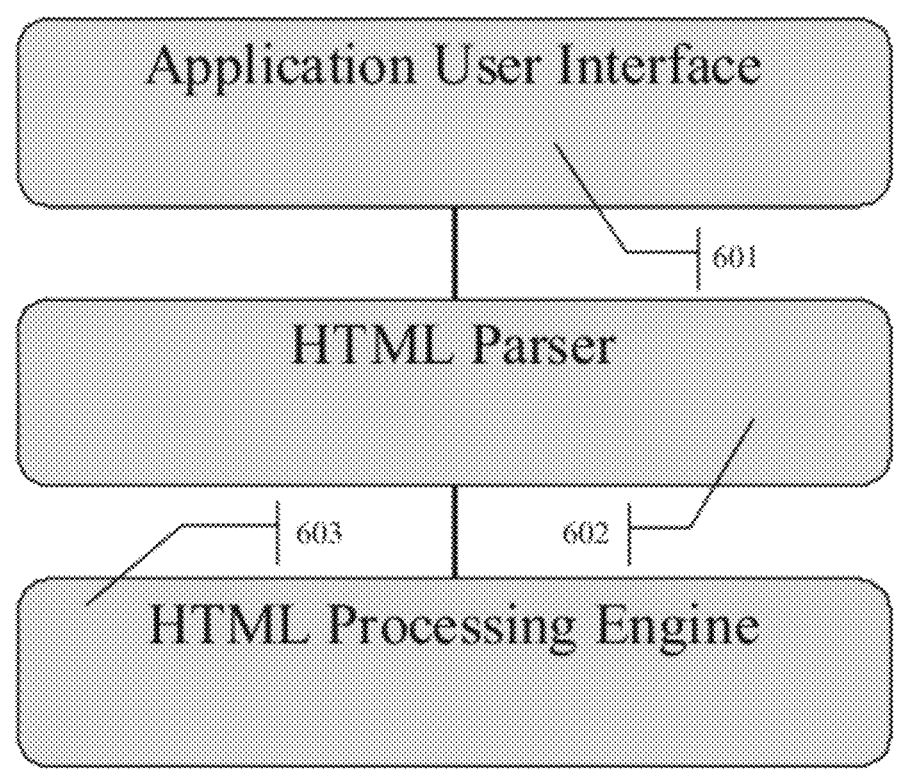
FIG. 6 illustrates the software architecture for a software application that includes an embodiment of the present invention.

FIG. 6 illustrates a block diagram of an application program that includes one embodiment of the present invention. Block 601 is an application user interface that allows a user to select an HTML file or a directory of HTML files for processing. Block 601 may further allow a user to select which specific types of embedded objects to extract from the HTML file. Block 601 may further allow a user to select where to save the HTML files containing the embedded objects. Block 601 may further allow a user to select how to name the HTML files. Block 602 parses HTML and finds scripts, CSS, context text, and other embedded objects in the HTML files selected in block 601. Block 602 may be the HTML Agility Pack Library, an open source library that has been contributed to the CODEPLEX open source library project hosted by Microsoft Corporation. Block 603 is an HTML Processing Engine that detects plagiarism in the HTML files received from block 602.

Figure 7:
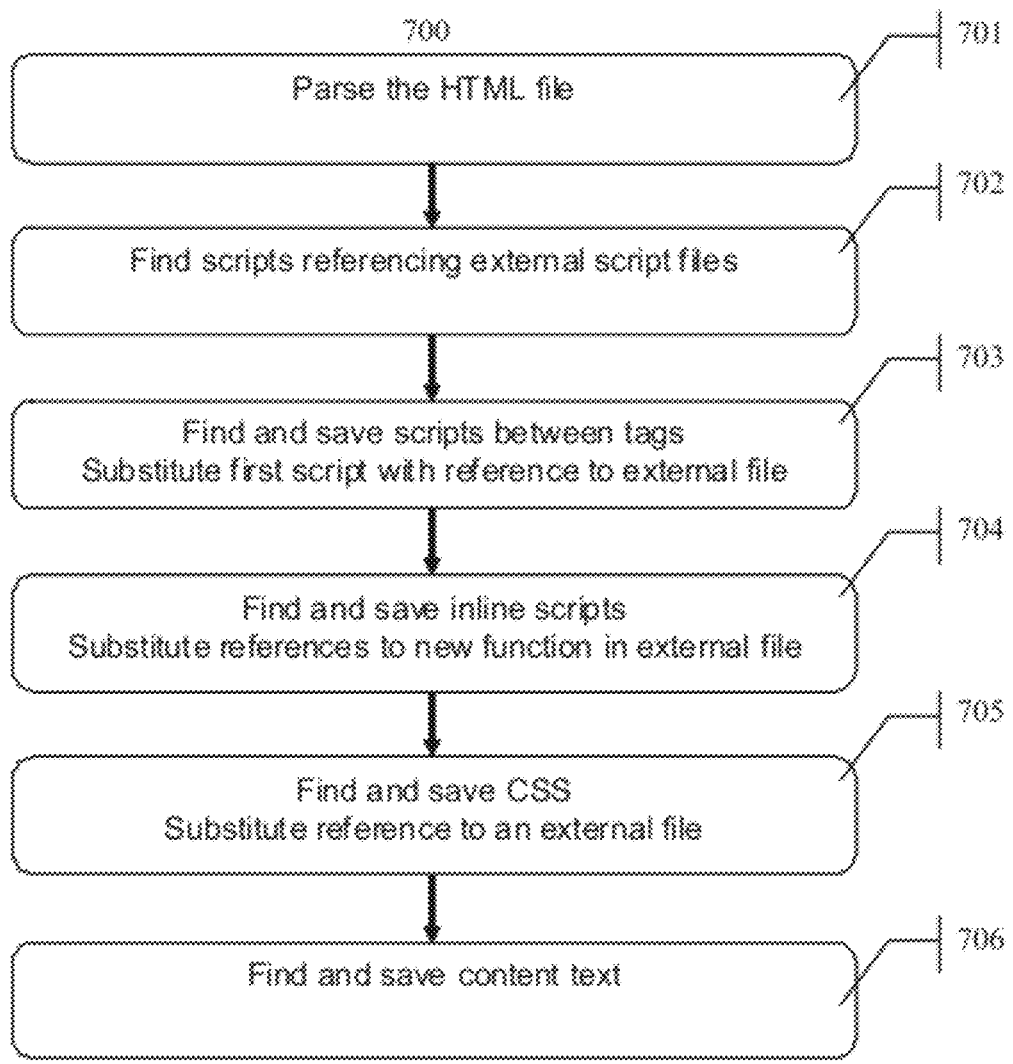
FIG. 7 illustrates a flow diagram of the first pass of one embodiment of the present invention that uses a two-pass method.

FIG. 7 illustrates one embodiment of a method 700 for a first pass of a two-pass process to extract scripts, CSS, and content text and to create pseudocode from an HTML file. Method 700 can be performed by processing logic that can comprise hardware (e.g., circuitry, dedicated logic, programmable logic, microcode, etc.), software (e.g., instructions run on a processing device), or a combination thereof. In this embodiment, method 700 is performed by block 603 of FIG. 6.

At block 701, one or more embedded objects located in an HTML file are obtained. The embedded objects are obtained using the HTML Agility Pack Library that parses the HTML file to locate the embedded objects.

At block 702, the embedded objects are searched to determine whether any of the embedded objects contain script code. There can be three types of script code embedded in the HTML: (1) script code that references an external file, (2) script code embedded directly in the HTML file between script tags, and (3) inline scripts without script tags.

Script code that references an external file may look like this:
<script language="JavaScript" src="scripts/safe_utilities.js"></script>

When this kind of embedded script is encountered, no modification is made to the HTML file.

Script code embedded directly in the HTML file between script tags may look like this:

```
<script language="JavaScript" type="text/JavaScript">
function MM_preloadImages( ) { //v3.0
  var d=document; if(d.images){ if(!d.MM_p) d.MM_p=new Array( );
    var i,j=d.MM_p.length,a=MM_preloadImages.arguments;
    for(i=0; i<a.length; i++)
    if (a[i].indexOf("#")!=0){ d.MM_p[j]=new Image;
    d.MM_p[j++].src=a[i];} }
}
</script>
```

In one embodiment, when this kind of embedded script is encountered, the script between the tags is saved to a file called filename_n.xxx where filename is an arbitrarily chosen name and the file extension xxx is the standard file extension for the type of script code found. The number n is an integer that is incremented by one for each pair of script tags encountered while examining the HTML file. For example, JavaScript would be placed in a file called filename_1.js. The script type is determined from the language attribute in the original script tag. If the language attribute is not given in the script tag, the script type may be inferred from examining the code itself. The first time a section of script code is replaced in the HTML file, with the following HTML code as shown in block 703:
<script language="JavaScript" type="text/javaScript" src="file://filename_n.xxx"></script>

One embodiment of the present invention extracts CSS style elements enclosed between <style> and </style> tags to a file named filename_n.css where filename is an arbitrarily chosen name. The number n is an integer that is incremented by one for each pair of style tags encountered while examining the HTML file. The section of CSS code, including all style elements, is replaced in the HTML file with the following HTML code as shown in block 705:
<link type="text/css" media="screen" rel="stylesheet" href="file://filename_n.css">

One embodiment of the present invention extracts text content, as shown in block 706, to a file named filename.txt where filename is an arbitrarily chosen name and where txt is the standard file extension signifying that the file contains text. Content text is the text that appears outside of markup language tags. In an HTML web page, content text is the text that is shown on the web page generated by the HTML. All content text remains unchanged in the markup language file during this first pass.

One embodiment of the present invention performs a second pass through the markup language file that was previously modified by a process that extracted scripts, CSS, and context text. Unpaired tags are converted to a C-like tag pseudocode function that returns a void data type (i.e., does not return a value), where the name of the function is the type of tag plus a number to signify the instance of the tag. Attributes of the tag are converted into string declarations within the function. The attribute name is converted into a string variable name. The value of the attribute is converted into a string value assignment. Scripts within the tag are converted into separate functions that are called by the tag function. For example, consider the following HTML input element:

```
<input type="text" maxlength="64" name="location" id="edit-location"
size="30" value="Enter Location for Jobs" tabindex="5" onfocus=
"removeText(''edit-location'',''Enter Location for
Jobs'')" onblur="addText(''edit-location'',''Enter
Location for Jobs'')" onkeyup="" class="form-text" />
```

This embodiment maps this HTML input element into the following pseudocode:

```
void function input_1
{
    char* type="text";
    char* maxlength="64";
    char* name="location";
    char* id="edit-location;
    char* size="30";
    char* value="Enter Location for Jobs";
    char* tabindex="5";
    char* class="form-text";
    call input_1_1_subonfocus( );
    call input_1_1_subonblur( );
    call input_1_1_onkeyup( );
}
bool input_1_subonfocus( )
{
    int linenumber = XXX;
    char* arg1 = "edit-location"
    char* arg2="Enter Location for Jobs"
    return removeText(arg1,arg2)"
}
bool input_1_subonblur( )
{
    int linenumber = XXX;
    char* arg1 = "edit-location"
    char* arg2="Enter Location for Jobs"
    return addText(arg1,arg2)"
}
bool input_1_subonkeyup( )
{
    int linenumber=XXX;
    return true;
}
```

In one embodiment, paired tags are converted to a C-like tag function that returns a void data type (i.e., does not return a value), where the name of the function is the type of tag plus a number to signify the instance of the tag. Attributes of the tag are converted into string declarations within the function. The attribute name is converted into a string variable name. The value of the attribute is converted into a string value assignment. Scripts within the tag are converted into separate functions that are called by the tag function. Code or content text that found between the paired tags is converted into local functions and variables within the pseudocode function. Text appearing between tags is assigned to the variable called value. For example, consider the following HTML table cell element:

```
<td height="75" colspan="2" bgcolor="#0a73bb">
table data
</td>
```

This embodiment of the present invention maps the HTML table cell element to the following pseudocode:

```
void td_2( )
{
    char* height = "75";
    char* colspan = "2";
    char* bgcolor = "#0a73bb";
    char* value="table_data";
}
```

In one embodiment of the present invention, markup language comment blocks enclosed between <!-- and --> tags are converted to C style comment blocks between characters /* and */ in the pseudocode file. For example, consider the following HTML comment: <!-- InstanceBegin template="/Templates/back_page.dwt" codeOutsideHTMLIsLocked="false"-->

This HTML comment gets converted into the following pseudocode comment:
/* InstanceBegin template="/Templates/back_page.dwt" codeOutsideHTMLIsLocked="false"*/

The following markup tags, which may appear in an HTML document, are elements from the Standard Generalized Markup Language ("SGML") markup language:

```
<!DOCTYPE
<!ENTITY
<![PDATA[
<![CDATA[.
<?
```

One embodiment of the present invention converts these SGML tags and their attributes to C style comment blocks between characters /* and */ in the pseudocode file. For example, consider the following SGML tag:
<!DOCTYPE HTML PUBLIC "-//W3C//DTD HTML 4.01 Transitional//EN">, This HTML comment gets mapped to the following pseudocode comment:
/*<!DOCTYPE HTML PUBLIC "-//W3C//DTD HTML 4.01 Transitional//EN">*/

Figure 8:
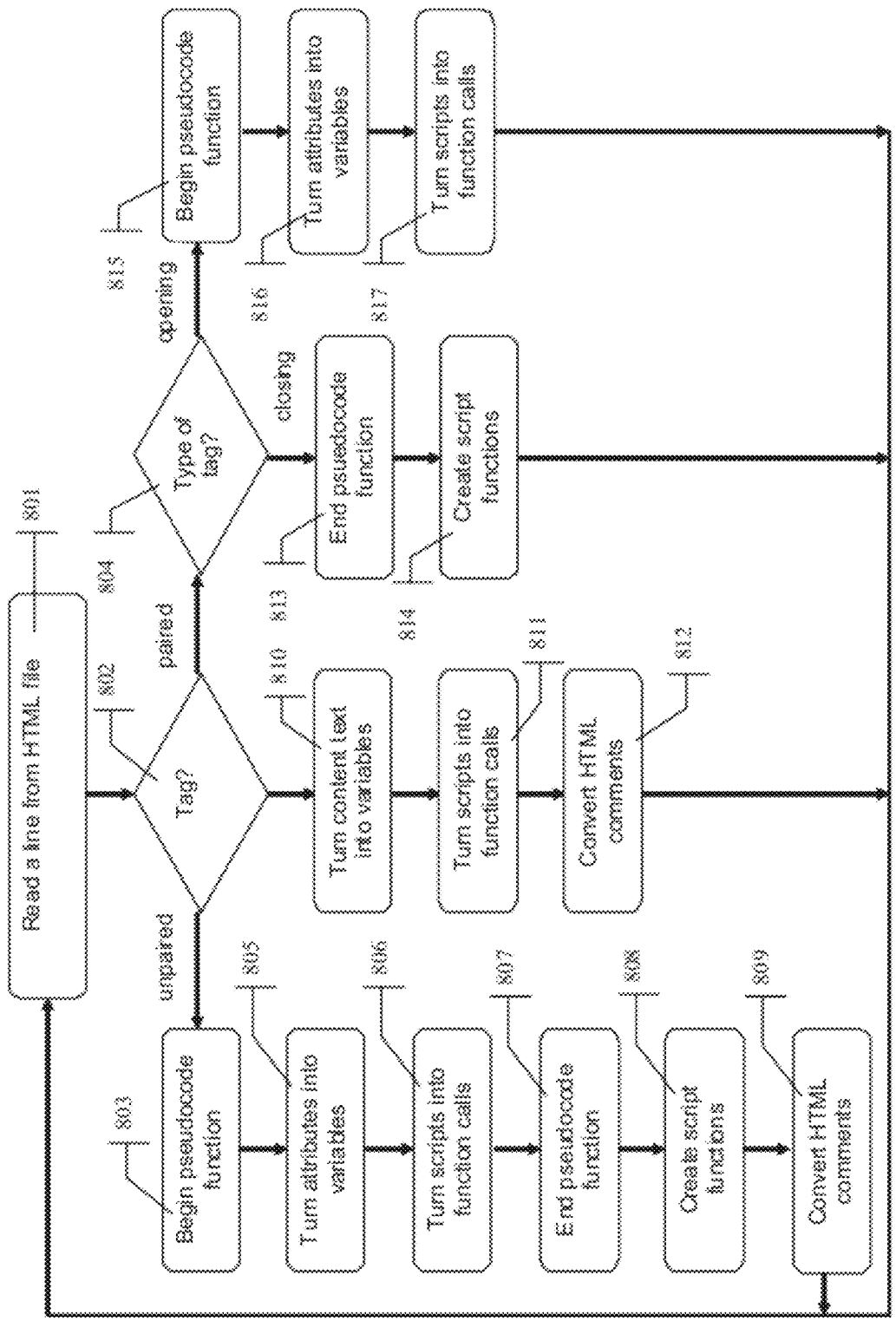
FIG. 8 illustrates a flow diagram of the second pass of one embodiment of the present invention that uses a two-pass method.

FIG. 8 illustrates a flow chart for the second pass of one embodiment of the present invention. At block 801 a line is read from an HTML file. At block 802 the line is tested to determine whether it contains an HTML tag. If the line contains an unpaired tag, execution continues at block 803. If the line contains a paired tag, execution continues at block 804. If the line does not contain a tag, execution continues at block 810.

When there is not a tag and execution continues at block 810, all content text in the line read from the HTML file is turned into variables in the pseudocode. Execution continues at block 811 where all scripts in the line read from the HTML file are turned into function calls. Note that at this point there must have been a previous opening tag, at least the <head> or <body> tag, so these function calls must be stored in memory so that they can be written to the pseudocode file after the corresponding closing tag is found. Execution then continues at block 812 and all HTML comments in the line read from the HTML file are turned into comments in the pseudocode file. Execution continues at block 801 where another line is read from the HTML file.

When there is an unpaired tag and execution continues at block 803, a new pseudocode function is created in the pseudocode file. Execution continues at block 805 where all attributes of the tag are turned into assigned variables in the pseudocode function. Execution continues at block 806 where all scripts in the line read from the HTML file are turned into function calls in the pseudocode function. Execution then continues at block 807 where the pseudocode function is ended in the pseudocode file. Execution continues at block 808 where all scripts previously read from the HTML line at block 806 are written to the pseudocode file as new pseudocode functions. Execution continues at block 809 where all HTML comments in the line read from the HTML file are turned into comments in the pseudocode file. Execution continues at block 801 where another line is read from the HTML file.

When there is a paired tag and execution continues at block 804, the tag is checked to determine whether it is an opening tag or a closing tag. If it the tag an opening tag, execution continues at block 815. If the tag is a closing tag, execution continues at block 813.

When there is an opening tag and execution continues at block 815, a new pseudocode function is created in the pseudocode file. Each new pseudocode function must be recorded so that each closing tag is associated with the appropriate pseudocode function when there are nested paired tags. Execution continues at block 816 where all attributes of the tag are turned into assigned variables in the pseudocode file. Execution continues at block 817 where all scripts in the line read from the HTML file are turned into function calls. All function calls must be stored in memory so that they can be written to the pseudocode file after the pseudocode function is ended when the corresponding closing tag is found. Execution continues at block 801 where another line is read from the HTML file.

When there is a closing tag and execution continues at block 813, the pseudocode function is ended in the pseudocode file. Execution continues at block 814 where all scripts read between the corresponding opening tag and this closing tag, in blocks 817 and 811, are written to the pseudocode file as new pseudocode functions. Execution continues at block 801 where another line is read from the HTML file.

At block 801 when all lines are read from the HTML file, execution stops.

Figure 9:
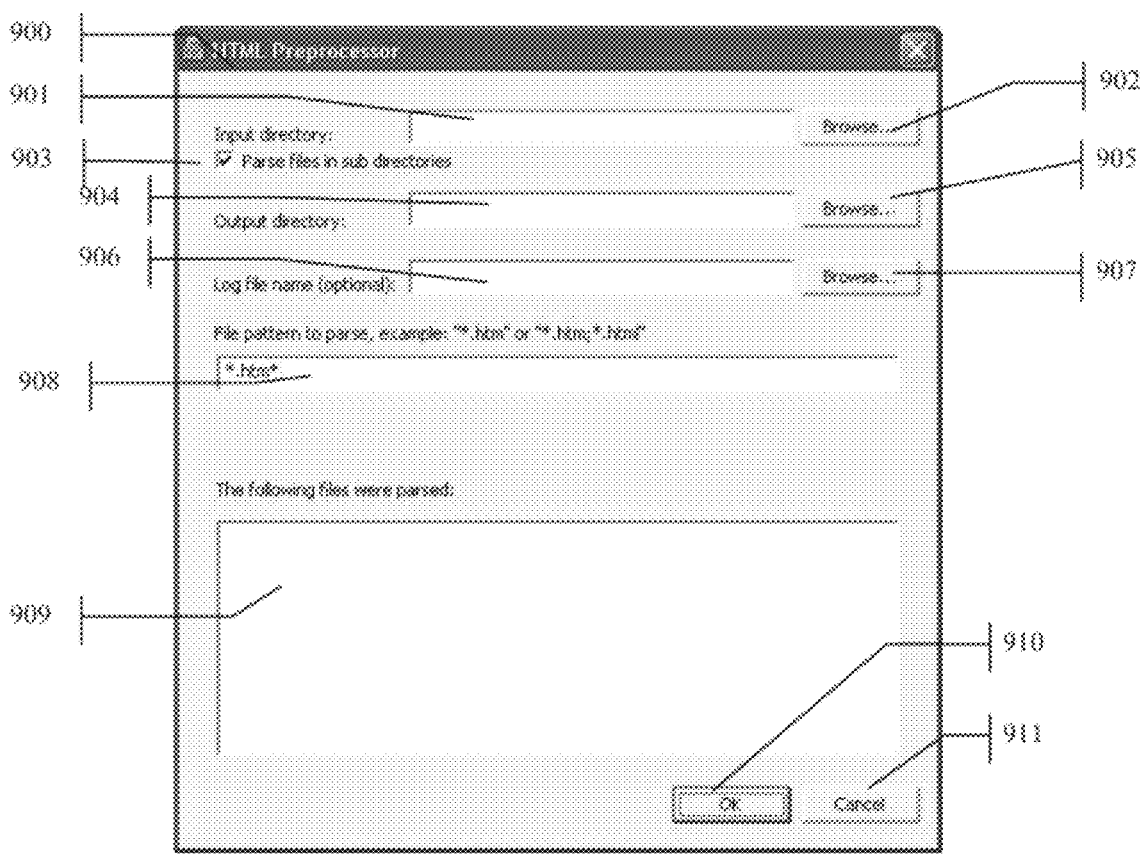
FIG. 9 illustrates a user interface of one embodiment of the invention.

FIG. 9 illustrates a user interface of one embodiment of the invention. The main form 900 contains all of the controls for the user to run the program. The user can enter the directory path manually into textbox 901 or can do so automatically by clicking button 902 that brings up a standard directory dialog box that allows the user to select an input directory. Once selected, the directory will be written by the program to textbox 901.

The user can select checkbox 903 that signals the program to examine the selected input directory and all subdirectories for HTML files to process. The user can deselect checkbox 903 to signal the program to only examine the selected input directory but not subdirectories.

The user can enter the output directory path manually into textbox 904 or can do so automatically by clicking button 905 that brings up a standard directory dialog box that allows the user to select an output directory. Once selected, the directory will be written by the program to textbox 904. The output directory specifies where the extracted files and modified HTML files should be written:

The user can enter the optional log file name and directory path manually into textbox 906 or can do so automatically by clicking button 907 that brings up a standard file dialog box that allows the user to select a log file. Once selected, the file and its path will be written by the program to textbox 906. The log file contains information about which files were created and which errors were encountered, if any. If the log file textbox is left blank, no log file will be generated.

In textbox 908 the user enters the file patterns for HTML files to be processed. While most HTML files have extensions .htm and .html, there are also back-end HTML files that have the extension of the embedded scripting language. For example, HTML files containing PHP scripting language code (that also may be considered to be PHP files containing HTML code) can have the file extension .php. By allowing the user to enter file patterns into textbox 908, the program makes no assumptions about the file names.

Textbox 909 shows a running list of files that were parsed and processed when the program is running. Button 910 is clicked by the user when all parameters are set and this signals the program to begin processing HTML files. Button 911 can be clicked by the user to signal that the program should not process any files and should terminate.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

We claim:

1. A computer-implemented method comprising:
   preparing, by a computing device, a first script file from a first markup language file for a plagiarism detection operation, the preparing comprising:
      parsing the first markup language file by the computing device to identify an opening script tag and a corresponding closing script tag in the first markup language file;
      saving code between the opening script tag and the closing script tag to the first script file;
      removing the opening script tag, the closing script tag and the code from the first markup language file; and
      replacing the removed opening script tag, closing script tag, and code with a reference to the first script file;
   preparing, by the computing device, a second script file from a second markup language file for the plagiarism detection operation; and
   performing, by the computing device, the plagiarism detection operation based on comparing the first script file to the second script file.

2. The method of claim 1, wherein the preparing of the first script file from the first markup language file is performed after the first markup language file has been generated, the first markup language file having been generated by a different computing device than the computing device.

3. The method of claim 1, wherein the opening and closing script tags are enclosed within one or more pairs of opening and closing tags, the method further comprising:
   converting code between the opening script tag and the closing script tag into a function call that is embedded within another function call.

4. The method of claim 1, wherein preparing the first script file further comprises generating the first script file.

5. A computer-implemented method comprising:
   preparing, by a computing device, a first script file from a first markup language file for a plagiarism detection operation, the preparing comprising:
      parsing the first markup language file by the computing device to identify code in the first markup language file that is inside an unpaired tag;
      saving the code to the first script file;
      removing the code from the first markup language file; and
      replacing the removed code with a reference to the first script file;
   preparing, by the computing device, a second script file from a second markup language file for the plagiarism detection operation; and
   performing, by the computing device, the plagiarism detection operation based on comparing the first script file to the second script file.

6. The method of claim 5, wherein the preparing of the first script file from the first markup language file is performed after the first markup language file has been generated, the first markup language file having been generated by a different computing device than the computing device.

7. The method of claim 5, wherein the unpaired script tag is enclosed within one or more pairs of opening and closing tags, the method further comprising:
   converting the code into a function call that is embedded within another function call.

8. A computer-implemented method comprising:
   preparing, by a computing device, a first cascading style sheet (CSS) file from a first markup language file for a plagiarism detection operation, the preparing comprising:
      parsing the first markup language file by the computing device to identify an opening style tag and a corresponding closing style tag in the first markup language file;
      saving code between the opening style tag and the closing style tag to the first CSS file;
      removing the opening style tag, the closing style tag and the code from the first markup language file; and
      replacing the removed opening style tag, closing style tag, and code with a reference to the first CSS file;
   preparing, by the computing device, a second CSS file from a second markup language file for the plagiarism detection operation; and
   performing, by the computing device, the plagiarism detection operation based on comparing the first CSS file from the first markup language file to the second CSS file from the second markup language file.

9. The method of claim 8, wherein the preparing of the first CSS file from the first markup language file is performed after the first markup language file has been generated, the first markup language file having been generated by a different computing device than the computing device.

10. A computer-implemented method comprising:
    preparing, by a computing device, a first pseudocode file from a first markup language file for a plagiarism detection operation, the preparing comprising:
       parsing the first markup language file by the computing device to identify an unpaired markup language tag in the first markup language file;
       converting the unpaired markup language tag to a pseudocode function, the converting comprising:
          converting one or more tag attributes into one or more variables; and
          converting one or more tag scripts into one or more function calls; and
       saving the pseudocode function to the first pseudocode file;
    preparing, by the computing device, a second pseudocode file from a second markup language file for the plagiarism detection operation; and performing, by the computing device, the plagiarism detection operation based on comparing the first pseudocode file to the second pseudocode file.

11. The method of claim 10, wherein converting the one or more tag attributes into the one or more variables comprises converting an attribute of the unpaired markup language tag to a string variable within the pseudocode function.

12. The method of claim 11, wherein converting the attribute of the unpaired markup language tag to the string variable comprises converting an attribute name to a string variable name and assigning a value of the attribute to the string variable.

13. The method of claim 10, wherein the preparing of the first pseudocode file from the first markup language file is performed after the first markup language file has been generated, the first markup language file having been generated by a different computing device than the computing device.

14. The method of claim 10, wherein the unpaired markup language tag is enclosed within one or more pairs of opening and closing tags, the method further comprising:
converting the tag into a function call that is embedded within another function call.

15. The method of claim 10, wherein the pseudocode function has a function structure associated with a particular programming language.

16. A computer-implemented method comprising:
preparing, by a computing device, a first pseudocode file from a first markup language file for a plagiarism detection operation, the preparing comprising:
parsing the first markup language file by the computing device to identify an opening markup language tag and a corresponding closing markup language tag in the first markup language file;
converting the opening markup language tag, the closing markup language tag and text between the opening markup language tag and the closing markup language tag to a pseudocode function; and
saving the pseudocode function to the first pseudocode file;
preparing, by the computing device, a second pseudocode file from a second markup language file for the plagiarism detection operation; and
performing, by the computing device, the plagiarism detection operation based on comparing the first pseudocode file to the second pseudocode file.

17. The method of claim 16, wherein converting the text to the pseudocode function comprises converting a tag attribute to a string variable within the pseudocode function.

18. The method of claim 17, wherein converting the tag attribute to the string variable comprises converting an attribute name to a string variable name and assigning a value of the tag attribute to the string variable.

19. The method of claim 16, wherein the preparing of the first pseudocode file from the first markup language file is performed after the first markup language file has been generated, the first markup language file having been generated by a different computing device than the computing device.

20. The method of claim 16, wherein the opening and closing markup language tags are enclosed within one or more pairs of opening and closing tags, the method further comprising:
converting the text between the opening markup language tag and the closing markup language tag into a function call that is embedded within another function call.

21. The method of claim 16, wherein the pseudocode function has a function structure associated with a particular programming language.

22. The method of claim 16, wherein converting the text to the pseudocode function comprises:
creating a string variable within the pseudocode function; and
assigning a value to the string variable equal to the text.

23. A computer-implemented method comprising:
preparing, by a computing device, a first pseudocode file from a first markup language file for a plagiarism detection operation, the preparing comprising:
parsing the first markup language file by the computing device to identify an opening markup language comment tag and a corresponding closing markup language comment tag in the first markup language file;
converting text between the opening markup language comment tag and the closing markup language comment tag to a pseudocode comment; and
saving the pseudocode comment to the first pseudocode file;
preparing, by the computing device, a second pseudocode file from a second markup language file for the plagiarism detection operation; and
performing, by the computing device, the plagiarism detection operation based on comparing the first pseudocode file to the second pseudocode file.

24. The method of claim 23, wherein the preparing of the first pseudocode file from the first markup language file is performed after the first markup language file has been generated, the first markup language file having been generated by a different computing device than the computing device.

25. The method of claim 23, wherein the pseudocode comment has a comment structure associated with a particular programming language.

26. A computer-implemented method comprising:
preparing, by a computing device, a first pseudocode file from a first markup language file for a plagiarism detection operation, the preparing comprising:
parsing the first markup language file by the computing device to identify an unpaired markup language comment tag in the first markup language file;
converting the unpaired markup language comment tag to a pseudocode comment; and
saving the pseudocode comment to the first pseudocode file;
preparing, by the computing device, a second pseudocode file from a second markup language file for the plagiarism detection operation; and
performing, by the computing device, the plagiarism detection operation based on comparing the first pseudocode file to the second pseudocode file.

27. The method of claim 26, wherein the pseudocode comment has a comment structure associated with a particular programming language.

* * * * *